Nov. 29, 1955 H. N. MAGIDA 2,725,232

PUSH AND PULL FRICTION TYPE EXERCISER

Filed Sept. 21, 1951 2 Sheets-Sheet 1

10
10b
14
14a
8
9
13
10
8
28
10a

INVENTOR.
Herbert N. Magida
BY Edward W. Weikert
Attorney

Nov. 29, 1955 H. N. MAGIDA 2,725,232
PUSH AND PULL FRICTION TYPE EXERCISER
Filed Sept. 21, 1951 2 Sheets-Sheet 2
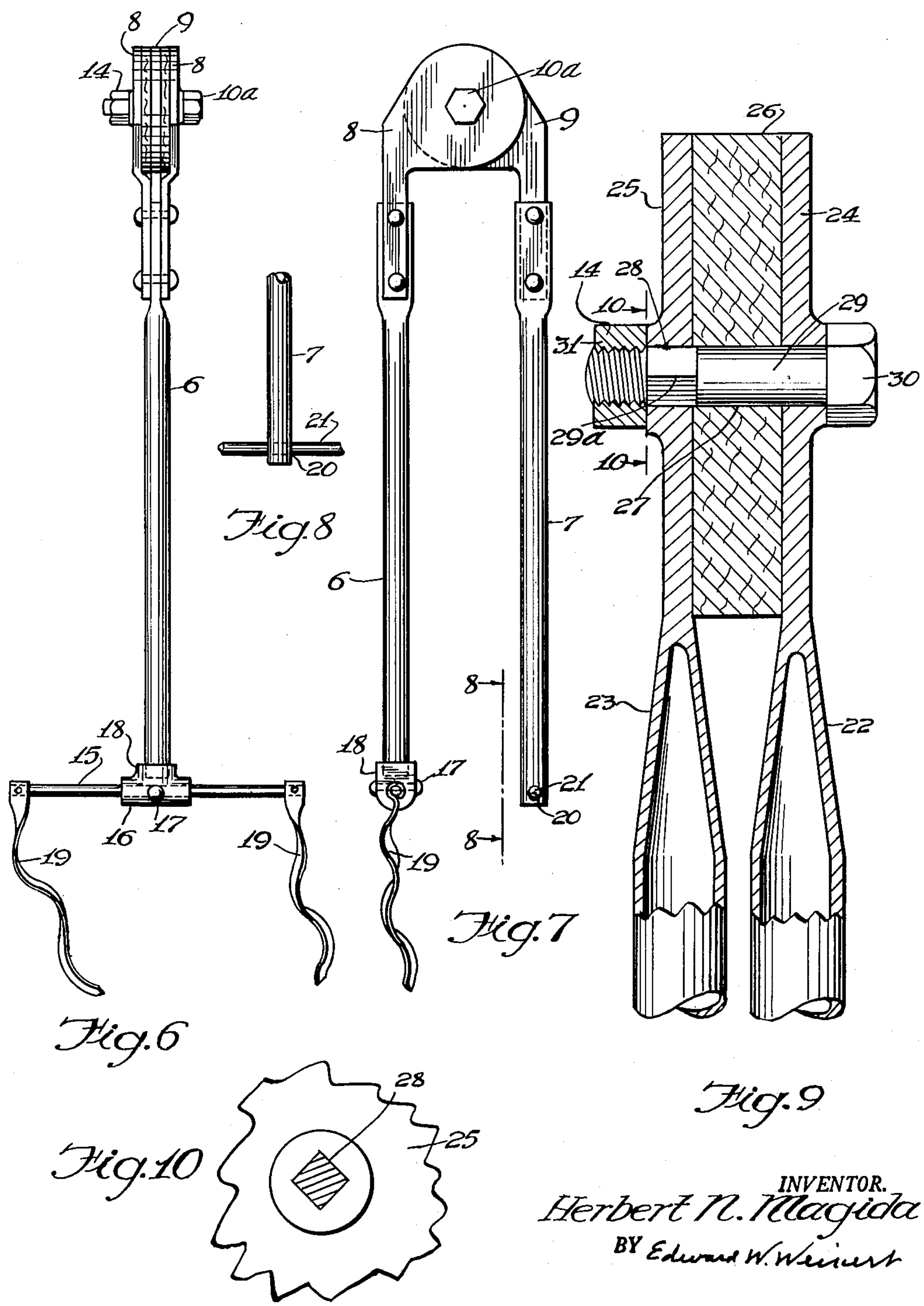
INVENTOR.
Herbert N. Magida
BY Edward W. Weinert
Attorney

United States Patent Office 2,725,232

Patented Nov. 29, 1955

1

2,725,232

PUSH AND PULL FRICTION TYPE EXERCISER

Herbert N. Magida, Chicago, Ill.; Brina K. Magida, administrator of the estate of said Herbert N. Magida, deceased Application September 21, 1951, Serial No. 247,595

1 Claim. (Cl. 272—79)

This invention relates to an exercising device for use in gymnasiums and homes or the like, and concerns itself with a freely swingable hand and arm operated device comprising expansible and contractible arms having a frictional connection which prevents distortion and maintains a balanced relation, and in which there is no relative movement between the adjusting nut and the adjacent swingable arm for loosening the nut during the operation of the device.

The invention constitutes an improvement over the device disclosed in my Patent No. 2,543,729, granted February 27, 1951.

The main object of the present invention is to maintain a proper balance between the arms without the creation of objectionable torsion.

A further object of the invention is to simplify the structure while eliminating torsion between the arms.

The invention comprises the novel structure and combination of parts hereinafter described and more particularly pointed out and defined in the appended claim.

In the accompanying drawing which illustrates a preferred form of this invention and in which similar reference numerals refer to similar features in the different views:

Fig. 6 is an end elevational view of the exercising device shown in Figs. 1 to 5 with the attachments thereon;

Fig. 7 is a side elevational view of the same;

Fig. 8 is a fragmentary elevational view taken from the line 8—8 of Fig. 7;

Fig. 9 is a sectional view through a slight modified form of exercising device; and Fig. 10 is a fragmentary elevational view taken upon the line 10—10 of Fig. 9 or Fig. 5.

Figures 1, 2, 3, 4, 5:
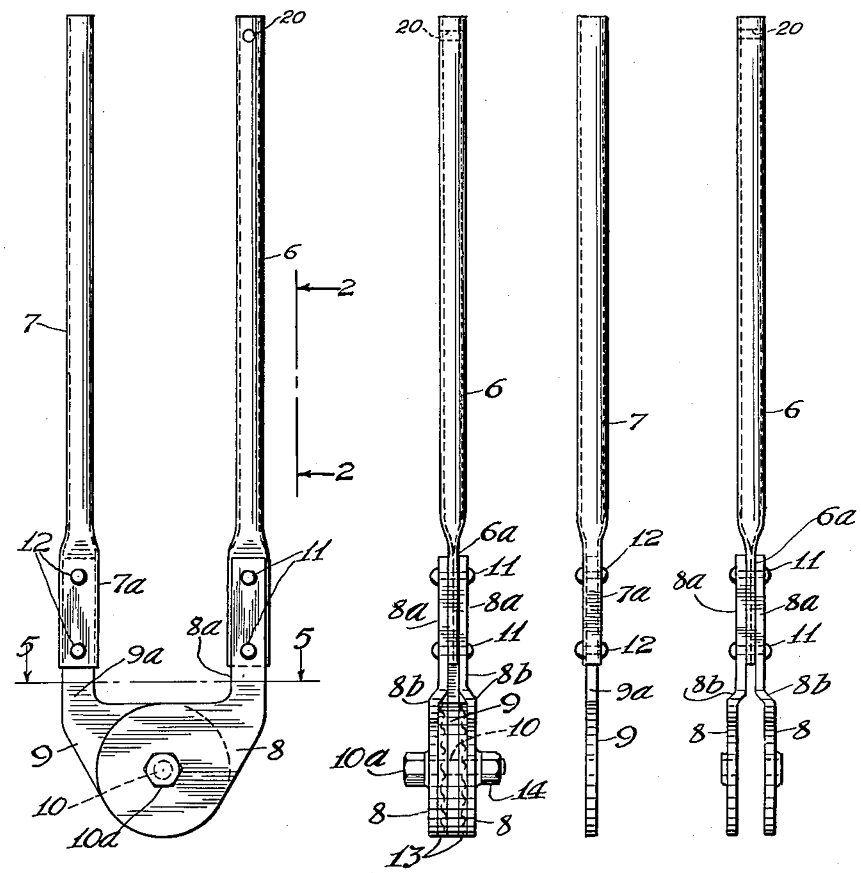
Fig. 1 is a side elevational view of an exercising device involving this invention.
Fig. 2 is an edge elevational view of the embodiment of Fig. 1.
Fig. 3 is an edge elevational view of an arm in detached relation.
Fig. 4 is an edge elevational view of the other arm in detached relation.
Fig. 5 is an enlarged sectional view taken upon the line 5—5 of Fig. 1 looking in the direction of the arrows.

In referring now to the drawing and especially to Figs. 1 to 5, there is shown an exercising device comprising arms 6 and 7 having plates or disks 8 and 9 respectively at their lower ends which are turned toward each other and pivotally connected by an adjustable screw bolt 10 so that the arms 6 and 7 are in spaced relation at their pivoted ends.

The arm 6 is shown as consisting of a tubular member which is flattened at its lower end as indicated at 6*a* for the attachment of the shanks 8*a* of the disks 8, one upon each side by any suitable bolts or rivets 11. It will be noted that the disk portions 8 extend substantially at right angles to the shank 8*a* and that they are outwardly offset as indicated at 8*b* to form a somewhat larger friction space. Thus the arm 6 has a bifurcated offset end for receiving the disk 9 of the arm 7.

The arm 7 is likewise a hollow member with a reduced lower end 7*a* for telescopic relation with the shank 9*a* of the disk 9, and which may be secured by bolts or rivets 12. The disk portion 9 extends at substantially a right angle to the shank portion and is designed to enter the friction space formed by the bifurcation of the arm 6.

Between the disks 8 and the disk 9 which is centrally positioned between the disks 8, there are friction means which may be rubber or fibrous disks 13, one upon each side of the disk 9. The disks 8, 9 and 13 are suitably apertured to receive the securing and adjusting bolt 10, which extends through the three disks and the friction means. One disk 8 is provided with a polygonal aperture 28 and the bolt 10 is correspondingly polygonal adjacent one end to fit the polygonal aperture 28.

The adjusting bolt 10 has an integral head 10*a* upon its outer end adjacent the polygonal section or portion, while the inner end of the bolt is provided with a threaded portion 10*b* of high pitch which threads into the bore 14*a* of a nut 14 upon the other disk 8. By rotating the nut 14, the friction between the disks 8 and 9 can be varied as desired. With this particular construction, any frictional adjustment can be quickly obtained. The high pitch of the screw connection permits fine adjustments which are very desirable in such a device. In using a polygonal aperture in one plate 8 and a bolt with a polygonal portion in such aperture, there can be no relative movement between the adjusting nut and the arm containing the polygonal aperture for loosening the nut.

In use, the exerciser will grasp the device by its two arms, one in each hand, and expand and contract the same, and at the same time, he can elevate or lower the same and freely swing the same in any direction.

In such use, the arms 6 and 7 always remain in balance since there is no torsion or twisting of either arm due to the fact that the bifurcation formed by the disks 8 equalizes the effect upon the central disk 9 and causes the disks 8 to travel in unison. The free end of the arm 7 is shown with an aperture 20 adapted for receiving a foot engaging rod which may be desirable under certain circumstances.

For it will be evident that the parallel plates 8 on the arm 6 will prevent distortion thereof while the plate or disk 9 therebetween will move under equalized friction upon the sides thereof. This will prevent any distortion or bending or twisting of the arms during the use of the device. The friction drag will always be in balanced relation with respect to the arms.

In Figs. 6 and 7, the exercising device is shown with its arms 6 and 7 equipped with attachments whereby the device may be anchored to a bed frame or the like and operated by a person reclining in the bed. To this end, there is provided an anchor bar 15 which is secured in a T-coupling 16 by a rivet 17 or the like. This T-coupling has a socket 18 adapted to tightly fit the free end of the arm 6; if desired, it may be removably secured in any well known manner. A pair of anchor straps 19 are shown attached to the anchor bar 15 and these straps are adapted to secure the anchor bar 15 to any suitable cross frame member on a bed for anchoring the arm 6 with the friction disks thereabove.

The free end of the arm 7 is provided with an aperture through which a foot operated rod 21 may be inserted. With the arm 6 anchored against movement and extending in a vertical position, the rod 21 will lie adjacent the mattress of the bed so that a patient lying in bed can engage the rod 21 with his feet and move the same toward the foot of the bed; then he may engage his heels over the bar 21 and move the same toward himself. In some instances, the patient may place his feet back of the rod 21 and draw the same toward himself. In this manner, the patient can exercise and strengthen his legs.

These attachments are designed to be placed upon the free ends of the arms of the exercising device when desired for use by a patient in bed, and removed when it is desired to use the device in the normal manner by the arms by contracting and expanding the same.

In Figs. 1 to 8, the exercising device has been shown with one arm having a bifurcation for securing a good balance and avoiding torsional strains. In Figs. 9 and 10, there is shown a slightly modified exercising device in which the bifurcation is omitted, producing a less costly device which may be used in some instances, especially by children. In these figures, there is shown a device having a pair of arms 22 and 23 which terminate in disks 24 and 25 between which there is a friction pad or disk 26. The disk 24 and the friction pad are provided with circular apertures 27 while the disk 25 is provided with a polygonal aperture 28 as in the first form. A bolt 29 having a head 30 abutting the disk 24 extends through the apertures 27 and 28 and this bolt has a polygonal section 29*a* which corresponds to and fits in the polygonal aperture 28 in the disk 25. A nut 31 is threaded upon the outer end of the bolt 29 and abuts the disk 25. This nut may be adjusted to vary the friction as desired. The polygonal aperture and bolt section produces a polygonal connection between the bolt and arm 25 which prevents relative rotation thereof.

It will be appreciated that if the arm 23 were journalled upon the bolt 29 for free relative movement, it would frictionally engage the nut 31 and work the same loose which would be a serious objection. However, with the polygonal connection, the bolt and nut 31 partake of the same rotational movement as the disk 25, thus making it impossible for the nut 31 to be worked loose.

It will further be appreciated that in providing the device with attachments for anchoring one arm to a bed for the operation of the other arm by a patient reclining in bed, the exercising device can serve an additional useful purpose.

I am aware that many changes may be made and various details of construction may be modified without departing from the principles of this invention so I do not propose limiting the patent granted otherwise than necessitated by the appended claim.

I claim:

An exercising device comprising an elongated operating arm having a bifurcation forming a pair of parallel disks at one end, a second elongated operating arm having a disk at one end located between the disks upon the first-mentioned arm, friction pad means located between the disk on said second arm and each of the first-mentioned disks, one of the disks on said bifurcated arm having a non-circular aperture pivot means extending between said disks and friction means for supporting same for relative pivotal movement, said pivot means comprising a headed pivot bolt passing through said arm disks and friction means and having a non-circular portion fitting within said non-circular disk aperture to prevent relative rotation between said bolt and the arm disk containing said aperture, said bolt passing freely through the intermediate arm disk to permit relative rotation therebetween, and means for forcing said disks and friction means together, said last-named means comprising an adjustable nut threaded onto the end of said pivot bolt and sandwiching the arm disks and friction means between the head of the bolt and said nut, said elongated operating arms being many times longer than the diameter of said disks whereby the ends of said arms opposite said one ends may be moved relative to one another along an arc of appreciable radius having its center coextensive with said pivot means, and said friction means being adapted to make sliding frictional contact with the arm disks to oppose the free movement of said operating arms relative to each other whereby the muscles of the operator are exercised.

References Cited in the file of this patent

UNITED STATES PATENTS

| | | |
|---|---|---|
| Re. 23,744 | Magida | Nov. 24, 1953 |
| 1,015,347 | Schnaus | Jan. 23, 1912 |
| 1,089,337 | Graham | Mar. 3, 1914 |
| 1,899,555 | Campbell | Feb. 28, 1933 |
| 2,529,347 | Mohler et al. | Nov. 7, 1950 |
| 2,543,729 | Magida | Feb. 27, 1951 |